Patented Nov. 6, 1934

1,979,946

UNITED STATES PATENT OFFICE 1,979,946

PRODUCTION OF TIRES

Carl Krauch and Martin Mueller-Cunradi, Ludwigshafen-on-the-Rhine, Germany, assignors to I. G. Farbenindustrie Aktiengesellschaft, Frankfort-on-the-Main, Germany, a corporation of Germany No Drawing. Application August 30, 1928, Serial No. 303,114. In Germany October 20, 1927

16 Claims. (Cl. 154—14)

This invention relates to the production of tires similar to the rubber tires used for automobiles, bicycles, aeroplanes and other vehicles.

We have found that excellent resilient tires are obtained by vulcanizing the plastic polymerization products of butadiene in a manner similar to that employed in the production of tires from rubber. Both solid and pneumatic tires may be manufactured in this way. The material is also suitable for the production of tires containing a porous filling material.

The tires thus obtained have the very important property of maintaining their elasticity practically unchanged even at low temperatures and they compare favorably with respect to their other properties with tires obtained from rubber. The advantageous properties of such tires are also apparent if the product obtained by the polymerization of butadiene is admixed with rubber or a different plastic or elastic polymerization product of a diolefine, provided that the content of the latter substances is not too high.

Any of the additions usually made to the rubber in the manufacture of rubber tires may be admixed with the initial materials employed in the present case. Thus filling materials such for example as carbon black, zinc oxid and antimony sulfid or mineral rubber may be employed. Also substances such as plasticizers, for example, stearic acid or paraffin wax may be added in small amounts. Again vulcanizing additions, such as sulfur or substances furnishing sulfur, or allied substances, such as selenium or substances furnishing selenium may be added. Substances accelerating vulcanization may in some cases also be employed, such as organic compounds of sulfur, as for instance mercapto benzo-thiazol. Inorganic or organic coloring agents may also be incorporated. The said additions may be introduced in a suitable combination.

Example

A mixture of 100 parts of a plastic product obtainable by polymerization of butadiene with the aid of sodium, 40 parts of carbon black, 5 parts of zinc oxid, 5 parts of mineral rubber, 2 parts of wool grease, 3 parts of sulfur, 1 part of aldol-alpha-naphthyl amine and 0.6 part of mercapto benzo-thiazol is prepared by intimately mixing the said initial materials between rollers. The carcass of an automobile tire prepared in the ordinary way is covered with the mixture thus prepared and the tread thus prepared finished by vulcanizing in the usual manner.

What we claim is:

1. The process of producing tires which comprises forming the tire of a composition containing a substantial proportion of a plastic polymerization product of butadiene and vulcanizing the tire so formed.

2. The product of the process defined in claim 1.

3. The process of producing tires which comprises forming the tire of a composition containing a substantial proportion of a plastic polymerization product, obtainable by polymerizing butadiene with sodium, and vulcanizing the tire so formed.

4. The product of the process defined in claim 3.

5. The process of producing tires which comprises forming the tire of a composition, the major portion of which is a plastic polymerization product of butadiene, and vulcanizing the tire so formed.

6. The product of the process defined in claim 5.

7. The process of producing tires which comprises forming the tire of a composition, the major portion of which is a plastic polymerization product obtainable by polymerizing butadiene with sodium and vulcanizing the tire so formed.

8. The product of the process defined in claim 7.

9. The process of producing tires which comprises forming the body of the tire in the conventional manner, coating the body with a mixture of a plastic polymerization product of butadiene and other materials including a filler, vulcanizing agent and accelerator, the plastic polymerization product being present in the mixture in an amount predominating over the amount of other materials used, and vulcanizing the coated tire body.

10. The product of the process defined in claim 9.

11. The process of producing tires which comprises forming the body of the tire in the conventional manner, coating the body with a mixture of a plastic polymerization product of butadiene and other materials, including carbon black, as a filler, a vulcanizing agent and an accelerator, the plastic polymerization product being present in the mixture in an amount predominating over the amounts of other materials used, and vulcanizing the coated tire body.

12. The product of the process defined in claim 11.

13. The process of producing tires which comprises forming the body of the tire in the conventional manner, coating the body with a mixture of a plastic polymerization product, obtainable by polymerizing butadiene with sodium, and other materials including a filler, a vulcanizing agent and an accelerator, the plastic polymerization product being present in the mixture in an amount predominating over the amounts of other materials used, and vulcanizing the coated tire body.

14. The product of the process defined in claim 13.

15. The process of producing tires which comprises forming the body of the tire in the conventional manner, coating the body with a mixture of a plastic polymerization product, obtainable by polymerizing butadiene with sodium, and other materials including carbon black, as a filler, a vulcanizing agent and an accelerator, the plastic polymerization product being present in the mixture in an amount predominating over the amounts of other materials used, and vulcanizing the coated tire body.

16. The product of the process defined in claim 15.

CARL KRAUCH.
MARTIN MUELLER-CUNRADI.